April 18, 1950 C. B. ANDERSON 2,504,292
LEVELING APPARATUS AND METHOD
Filed Feb. 17, 1939 2 Sheets-Sheet 1
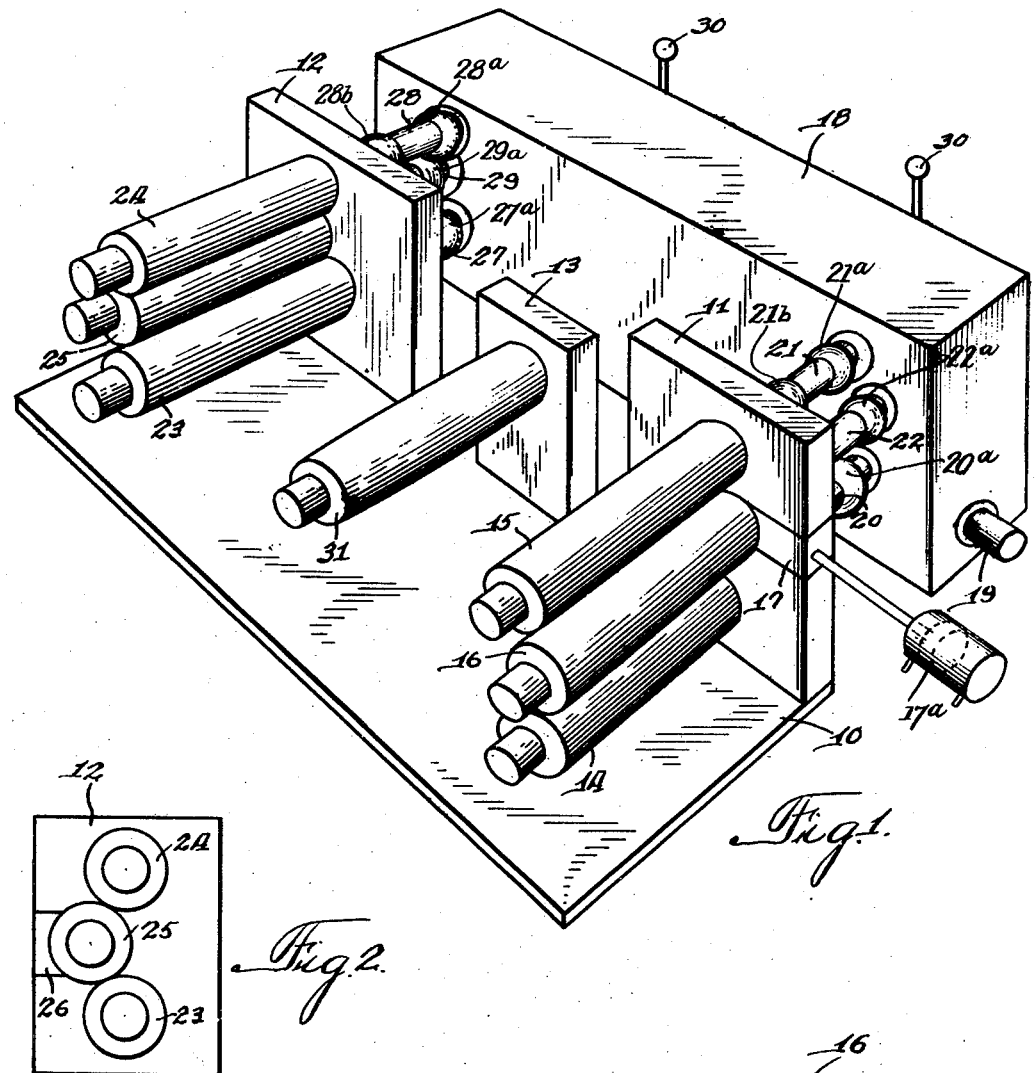
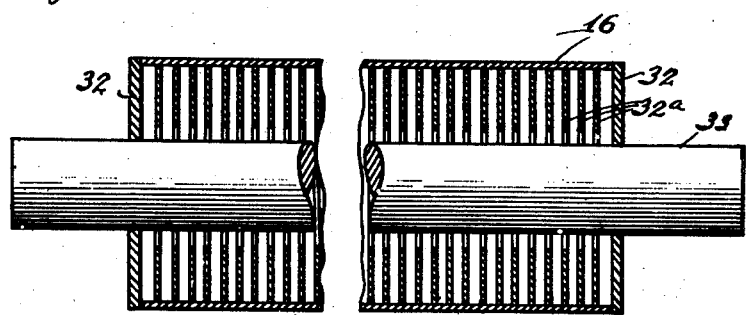
Inventor
Carl B. Anderson April 18, 1950 C. B. ANDERSON 2,504,292
LEVELING APPARATUS AND METHOD
Filed Feb. 17, 1939 2 Sheets-Sheet 2
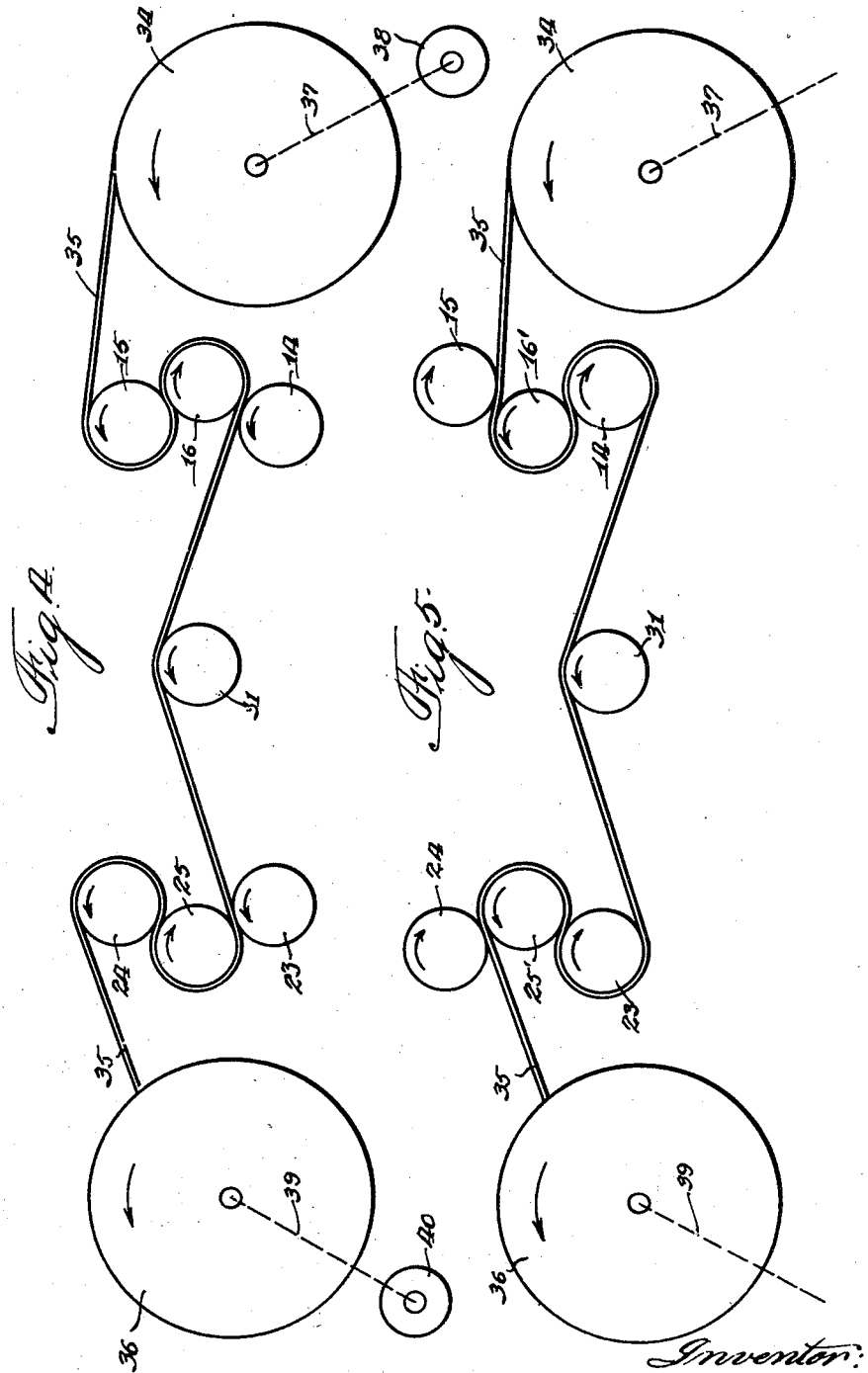
Inventor:
Carl B. Anderson.
By Ambo, Thiess, Olson & Mecklenburger.
Attys.

Patented Apr. 18, 1950

2,504,292

UNITED STATES PATENT OFFICE 2,504,292

LEVELING APPARATUS AND METHOD

Carl B. Anderson, Hessville, Ind.

Application February 17, 1939, Serial No. 257,011

9 Claims. (Cl. 205—1)

My invention relates to an apparatus and method for leveling or flattening strip materials, more particularly for continuously leveling sheet metal strip of any desired temper or hardness by stretching the same, and my invention has for an object the provision of an improved apparatus and method of this character.

It is an established fact that a maximum degree of flatness may be imparted to sheet steel or similar sheet metal by properly stretching the same, and apparatus has heretofore been provided for stretching and flattening otherwise finished steel sheets which, during the forming and finishing operations, often acquire bulges, buckles, or other irregularities. One such type of apparatus comprises means for gripping the opposite ends of finished steel sheets and exerted thereon the desired stretching forces. In using such apparatus considerable waste is encountered due to the fact that the gripping means inevitably mars the end portions of the sheets, so that these end portions must be subsequently sheared off and discarded. Thus a wastage of approximately 3" per sheet commonly occurs. Furthermore, since the sheets must be individually stretched after being cut to length, considerable time is utilized in handling the sheets and in adjusting the apparatus for each stretching operation.

It will thus be apparent that something is yet to be desired in apparatus and processes for stretching and leveling sheet metal, and accordingly it is a further object of my invention to provide a continuous process, and an apparatus for carrying out such a continuous process, by means of which steel or other metal strips of indefinite length may be stretched perfectly flat without wastage so as to provide a more economical, a faster, and a more efficient operation.

In carrying out my invention in one form, the metal strip to be flattened is continuously fed at a predetermined rate to a set of gripping rolls, the peripheral speed of which is adjusted to a predetermined value in excess of the feeding rate so as continuously to stretch the strip material a predetermined amount per lineal unit and thereby flatten it.

More particularly, I provide an apparatus comprising spaced-apart sets of entry and delivery rolls for progressing the material to be flattened. Each set of rolls includes a pair of outer rolls journaled on fixed axes in spaced-apart relation and an intermediate roll journaled on an axis which is adjustable at right angles to a plane taken through the axes of the outer rolls, the peripheral spacing of the outer rolls being less than the diameter of the intermediate roll and the intermediate roll being positioned at one side of the outer rolls in offset relation thereto. Yieldable means are provided for moving the intermediate roll toward and away from the outer rolls to permit threading of the work material therebetween, the material being looped about the intermediate roll so that an increase in the tension of the material during the flattening operation urges the intermediate roll toward the two outer rolls more tightly to grip the material and prevent slippage, the yielding means permitting such movement of the intermediate roll.

In addition, driving means are provided which are adapted to drive the delivery rolls at a predetermined higher peripheral speed than the entry rolls, so as progressively to stretch the material a predetermined amount per lineal unit and so flatten the material as it passes through the apparatus. In order to accommodate different materials, means are provided for adjusting the driving means to control the differential between the speeds of the two sets of rolls, and particularly where hard types of steel are to be flattened a crowned member or crowned idler roll may be positioned so as to engage the strip material intermediate the entry and delivery rolls, the purpose of the crowned idler roll being to impart to the center portion of the strip a greater degree of stretching than is imparted to the edge portions thereof.

For a more complete understanding of my invention, reference should now be had to the accompanying drawings, in which:

Figure 1 is a diagrammatic, perspective view of an apparatus embodying my invention, certain parts of the apparatus being omitted to illustrate the construction more clearly;

Fig. 2 is an end elevational view illustrating diagrammatically one of the sets of gripping rolls shown in Fig. 1;

Fig. 3 is a sectional view taken along the axis of one of the rolls shown in Fig. 1, illustrating the internal construction of certain of said rolls;

Fig. 4 is an illustrative diagram showing the interrelation of the various rolls and the work material during the operation of the apparatus illustrated in Fig. 1; and Fig. 5 is an illustrative diagram similar to Fig. 4, showing another embodiment of my invention.

Referring now to the drawings, in Fig. 1 I have shown my invention as embodied in an apparatus comprising a base 10 having a plurality of roll-supporting housings 11, 12 and 13 mounted along one side thereof, and it will be understood that similar roll-supporting housings are correspondingly mounted along the opposite side of the base 10, these similar housings being omitted from Fig. 1 in order more clearly to illustrate the arrangement of the various rolls.

As shown, the housing 11 supports a set of rolls 14, 15 and 16, which are arranged to grip continuous sheet or strip material as it is fed to the apparatus. The two outer rolls 14 and 15 constitute bottom and top rolls, respectively, and are journaled on spaced-apart fixed axes supported in the housing 11, which housing is preferably so arranged as to permit ready removal of the rolls 14, 15 and 16 for purposes of regrinding, etc.

The intermediate roll 16, which is adapted to cooperate with both of the outer rolls 14 and 15 in gripping material which has been threaded therebetween, is mounted on an axis that is adjustable horizontally, i. e., in a direction at right angles to a plane through the fixed axes of the rolls 14 and 15. This adjustment is preferably accomplished by yieldable means. Such means, which are illustrated in Fig. 1, may include a horizontally movable bearing support 17 and an air or hydraulic cylinder 17ª and cooperating piston as will be clearly apparent to those skilled in the art.

Although rolls of any desired size may be employed, I have found it advantageous to utilize rolls having outer diameters of at least 16", so that sheet steel or similar material will not flute when passing through and around the rolls. Preferably, the peripheral spacing of the fixed rolls is slightly less than the outer diameter of the intermediate roll 16, and accordingly the roll 16 is slightly offset from the fixed rolls 14 and 15, as shown in Figs. 1 and 2.

Adjacent the base 10 I provide a suitable gear housing 18 in which is arranged a suitable variable speed transmission mechanism (not shown), which may be connected to an electric driving motor or other suitable source of power through a shaft 19. Each of the rolls 14, 15 and 16 is connected to the mechanism within the gear housing 18 by suitable connections, such as are respectively indicated by the reference numerals 20, 21 and 22. Each of these connections is preferably provided with two universal joints, some of which are indicated at 20ª, 21ª, 21ᵇ and 22ª, since, as indicated above, it may be desirable at intervals during the operation of the apparatus to grind the surfaces of the rolls 14, 15 and 16, and the roll 16 is horizontally adjustable as above described.

The roll-supporting housing 12 carries a set of gripping delivery rolls 23, 24 and 25. The arrangement of these rolls is substantially identical with that of the rolls 14, 15 and 16, with the exception that the movable roll 25 is disposed on the opposite side of the rolls 23 and 24, which are similarly mounted on spaced-apart fixed axes. As shown best in Fig. 2, the roll 25 is provided with suitable movable bearing supports indicated diagrammatically and designated by the reference numeral 26, which may be provided with yieldable adjusting means the same as is the roll 16 such as a suitable air or hydraulically operated cylinder and piston arrangement.

The rolls 23, 24 and 25 are preferably so arranged as to provide for ready removal thereof for grinding purposes, and, as shown, are respectively connected in driving relation with the variable speed mechanism within the housing 18 by means of connections 27, 28 and 29, which, like the connections 20, 21 and 22, are preferably provided with universal joints, as indicated at 27ª, 28ª, 28ᵇ and 29ª.

Although any suitable type of variable speed gearing may be provided within the housing 18, I prefer to use dual type gearing, the mechanism being so arranged as to drive the delivery rolls 23, 24 and 25 at a peripheral speed which is higher than that of the entry rolls 14, 15, and 16. As will be explained more fully hereinafter, the differential between the speeds of the two sets of rolls determines the amount of stretching that is imparted to the work material for leveling or flattening purposes. The change speed gearing contained within the housing 18 is arranged to provide a relatively large number of speed changes, so that the said speed differential may be varied in small steps between a desired minimum and maximum, thereby closely controlling the amount of stretching imparted to the work material by the operation of the rolls. Although any desired means may be utilized for controlling the speed changing mechanism, I have shown for purposes of illustration a pair of gear shifting levers 30 which may be suitably arranged to serve this purpose.

I have found that when a hard type of steel is to be stretched for flatness, it is necessary to draw out the center of the strip more than the edge portions thereof. Accordingly I provide a crowned idler roll 31 which, as shown, is journaled in and supported by the housing 13 intermediate the entry and delivery rolls, and, as will be more apparent upon consideration of Figs. 4 and 5, this idler roll 31 is so located with respect to the entry and delivery rolls that the periphery of the idler roll engages the work material as it passes between the two sets of rolls, thereby imparting to the center of the strip a greater degree of stretching than to its edge portions. Preferably, the supporting housing 13 is arranged to permit the ready removal of the idler roll 31 so that it may be replaced with a similar roll having a greater or a less crown effect, in accordance with whether harder or softer steel or other material is to be passed through the apparatus.

Although, as indicated above, the entry rolls 14, 15 and 16 and the delivery rolls 23, 24 and 25 may be of any suitable construction, I have found it advantageous to so construct the movable rolls 16 and 25 as to provide for a certain amount of flexure thereof. In Fig. 3 I have shown what I now consider to be a preferred type of construction for the rolls 16 and 25, said figure being a sectional view taken along the center line of the roll 16. As there shown, the roll 16 consists of a hollow cylinder having a relatively thin wall, and I have found that for a 16" diameter roll a thickness of approximately $\frac{1}{8}$" or $\frac{3}{16}$" is sufficient. As shown, this hollow outer cylinder is supported at its opposite ends on suitable end members or discs 32 which may be secured to the hollow cylinder and to a coaxially extending shaft 33 in any suitable fashion, as for example by welding. Intermediate the end members 32, I provide a plurality of annular disc-like members 32ª arranged in axially spaced relation to each other and secured at their outer peripheries to the inner wall of the hollow cylinder.

These annular members 32ª are preferably formed of steel or similar material and are of relatively thin construction, the inner diameter of each annular member being greater than the diameter of the shaft 33 to provide substantial clearance therebetween. In the embodiment shown, the members 32ª are preferably about ¼" in thickness, are secured to the hollow cylinder at axially spaced intervals of approximately 1", and have openings therein of sufficient diameter to provide a clearance of approximately 1" between the shaft 33 and the inner edges of said openings. The annular members 32ª, while serving as stiffeners for the hollow cylinder, are arranged to permit flexure of the cylinder relative to the shaft, and I have found that the flexibility of the roll may be controlled by varying the radial dimension, the thickness, or the axial spacing of these annular members. In some cases it may be desirable to utilize annular members of such reduced radial dimension as to provide a clearance of several inches between the shaft and the inner edges of these members.

With the rolls 16 and 25 constructed as shown in Fig. 3, a flexible roll is provided so that if the material to be flattened is, say, two or three thousandths of an inch heavier in some portions than in others, the rolls 16 and 25 bend sufficiently to fit the same and accordingly there is no slippage on any part of the material as it passes through the entry and delivery sets of rolls.

Having in mind the above features of construction, it is thought that a complete understanding of my invention may now be had from a description of the operation thereof. Fig. 4 diagrammatically shows the entry rolls 14, 15 and 16, the delivery rolls 23, 24 and 25, and the idler roll 31 in substantially the relation illustrated in Fig. 1, and illustrates the operation of an apparatus of that type. The arrows applied to each of the rolls indicate the direction of rotation thereof, it being understood, of course, that the entry and delivery rolls are all positively driven, and that the rotation of the idler roll 31 is due entirely to the drag of the work material thereon.

Although the material to be stretched and flattened may be supplied to the entry rolls of this apparatus from any desired source, such, for example, as the delivery rolls of a finishing mill, and the stretched and flattened material may be supplied from the delivery rolls of the apparatus to any suitable storage means, I have shown for purposes of illustration a supply reel 34 from which continuous sheet or strip material 35 may be supplied to the entry rolls 14, 15 and 16, and a similar take-up reel 36 for accumulating the material 35 after it has been stretched and flattened.

Preferably, in order to guard further against slippage in any part of the apparatus, the tension on the supply and takeup reels should be maintained at a value nearly as great as the tension exerted on the material between the entry and delivery rolls. Accordingly, the supply reel 34 may be connected in any suitable manner, indicated by a broken line 37, with a suitable drag motor 38 which may be of a type well known in the art, and the take-up reel 36 may be similarly connected, as indicated by a broken line 39, with a pulling motor 40. The drag motor 38 and the pulling motor 40 may be controlled by any suitable means for regulating the forces exerted thereby, examples of which are, of course, well known in the art.

In the operation of my apparatus, as illustrated in Figs. 1 and 4 particularly, the sheet material 35 is fed from the supply reel 34 about the top roll 15, through the bight of the rolls 15 and 16, is looped about the movable roll 16, and through the bight of the rolls 14 and 16. In order to accomplish this threading, the roll 16 is preferably moved away from the rolls 14 and 15 by means of the yieldable operating means 17. Thereafter, said operating means return the roll 16 so as to grip the material tightly between the rolls 14, 15 and 16 in readiness for the operation of the apparatus.

From the entry rolls the material 35 is passed over the idler roll 31 and is similarly threaded through the delivery rolls 23, 24 and 25 in the manner shown, a portion of the material being looped about the movable roll 25, which is also preferably withdrawn from the rolls 23 and 24 temporarily for threading purposes. The end of the material 35 is then connected to the take-up reel 36.

It will now be apparent that, as the material 35 passes through the apparatus, it is progressively stretched and therefore leveled or flattened due to the fact that the delivery rolls are operating at a predetermined higher peripheral speed than the entry rolls, the degree of stretching being determined by the differential in the speeds, which differential may be adjusted to any desired value by means of the variable speed gearing contained within the gear housing 18. It will likewise be apparent that since the material is pulled over the crowned idler roll 31 between the entry and delivery rolls, the central portions of the sheet material are stretched to a somewhat greater degree than the edge portions thereof, this increased stretching of the central portions depending upon the amount of crowning of the idler roll 31. Where such additional stretching is not desired, a substantially flat idler roll may be utilized, or, if desired, this idler roll may be entirely omitted.

One important feature of the apparatus embodying my invention, as heretofore described, is that a predetermined amount of stretching per lineal unit is imparted to the work material regardless of the resistance to the stretching offered thereby. Furthermore, the arrangement of the rolls in the entry and delivery sets is such as positively to prevent slippage of the material relative to the rolls, regardless of the amount of tension exerted. It will be seen that the material is so looped about the movable rolls 16 and 25 that any increase in tension of the material 35 tends to move said rolls toward the associated fixed rolls 14, 15, and 23, 24, respectively, so as correspondingly to increase the gripping force exerted on the material by the rolls. Such inward movement of the rolls 16 and 25 is of course permitted by the yieldable operating means 17 and 26, respectively, associated with these rolls.

In Fig. 5 I have shown a modified form of apparatus, which is substantially the same as that illustrated in Figs. 1 and 4 except that the movable rolls of the entry and delivery sets are disposed on the opposite sides of the fixed rolls of said sets, and accordingly the material is threaded through the rolls in a slightly different fashion. In Fig. 5 corresponding parts are represented by the same reference numerals utilized in Figs. 1 to 4, inclusive, and the movable rolls corresponding to the rolls 16 and 25 of Figs. 1 and 4 are indicated by the reference numerals 16' and 25'.

The operation of the apparatus illustrated in Fig. 5 is believed to be apparent from the above description relative to Figs. 1 to 4, and it will be observed that here, again, any increase in the tension of the material 35 tends to move the rolls 16' and 25' toward the associated fixed rolls 14, 15, and 23, 24, respectively, so as correspondingly to increase the gripping force exerted by the rolls and thus prevent slippage of the material with respect thereto. As heretofore indicated, the peripheral spacing of the outer fixed rolls, in both the entry and delivery sets, is preferably less than the diameter of the associated movable rolls, and this arrangement materially assists in preventing slippage by providing a wedge-like grip on the material passing between the rolls.

It will be apparent from the above description of my improved process and apparatus that my invention provides for the stretching of continuous sheet or strip steel or other material to a perfectly flat condition and thereby affords a more economical, a faster and a more efficient flattening or levelling operation than has heretofore been considered possible.

Although the non-slipping sets of rolls, as heretofore described, are of particular advantage when utilized in stretching and flattening apparatus embodying my invention, it will be understood that this roll arrangement may be highly useful in various types of apparatus in which it is desired to prevent slippage. Thus, for example, non-slipping roll sets constructed in accordance with my invention may be utilized in a temper mill, in a strip washer, or in any other type of machine where tension rolls are needed, and where it is desired to prevent slippage regardless of the pull exerted by the material passing through the rolls.

While I have shown certain particular embodiments of my invention, it will be understood, of course, that I do not wish to be limited thereto since many modifications may be made therein. Therefore, I intend by the appended claims to cover any such modifications as fall within the true spirit and scope of my invention.

Having thus described my invention, what I claim and desire to secure by Letters Patent is:

1. In a flattening apparatus for sheet metal, spaced apart sets of entry and delivery rolls for gripping and positively progressing sheet material to be flattened, positively-acting driving means associated with said rolls for driving said delivery rolls at a positively predetermined higher peripheral speed than said entry rolls to stretch said sheet material solely by tension a predetermined amount per lineal unit as said material passes through said apparatus, and a crown-shaped member engaging said sheet material intermediate said sets of rolls for imparting to the central portion of said sheet material a greater degree of stretching by tension than is imparted to the edge portions thereof.

2. In a flattening apparatus for sheet metal, spaced apart sets of entry and delivery rolls for gripping and positively progressing sheet material to be flattened, positively-acting driving means associated with said rolls for driving said delivery rolls at a positively predetermined higher peripheral speed than said entry rolls to stretch said sheet material solely by tension a predetermined amount per lineal unit as said material passes through said apparatus, and a crowned idler roll engaging said sheet material intermediate said sets of rolls for imparting to the central portions of said sheet material a greater degree of stretching by tension than is imparted to the edge portions thereof.

3. In a flattening apparatus for sheet material, spaced apart sets of entry and delivery rolls for progressing sheet material to be flattened, each of said sets of rolls comprising a pair of outer rolls journaled on spaced apart fixed axes and an intermediate roll journaled on an axis adjustable at right angles to a plane through said fixed axes for gripping said sheet material between said rolls, the peripheral spacing of said outer rolls being less than the diameter of said intermediate roll and said intermediate roll being positioned at one side of said outer rolls, the path of travel of said sheet material through said sets of rolls comprising loops extending around said intermediate rolls whereby an increase in the tension of said material urges said intermediate rolls toward said outer rolls more tightly to grip said material therebetween and prevent slippage, and driving means associated with said rolls for driving said delivery rolls at a predetermined higher peripheral speed than said entry rolls to stretch said material a predetermined amount per lineal unit as said material passes through said apparatus and thereby flatten said material.

4. In a flattening apparatus for sheet metal, spaced apart sets of entry and delivery rolls for progressing sheet material to be flattened, each of said sets of rolls comprising a three-high stand having top and bottom rolls journaled on spaced apart fixed axes and an intermediate roll journaled on a horizontally adjustable axis, the peripheral spacing of said top and bottom rolls being less than the diameter of said intermediate roll and said intermediate roll being positioned at one side of said top and bottom rolls, the parts of travel of said sheet material through said sets of rolls being such that an increase in the tension of said material urges said intermediate rolls horizontally toward said top and bottom rolls more tightly to grip said material therebetween and prevent slippage, and driving means associated with said rolls for driving said delivery rolls at a predetermined higher peripheral speed than said entry rolls to stretch said material a predetermined amount per lineal unit as said material passes through said apparatus.

5. In a flattening apparatus for sheet metal, spaced apart sets of entry and delivery rolls for progressing sheet material to be flattened, each of said sets of rolls comprising a three-high stand having top and bottom rolls journaled on spaced apart fixed axes and an intermediate roll journaled on a horizontally adjustable axis, the peripheral spacing of said top and bottom rolls being less than the diameter of said intermediate roll and said intermediate roll being positioned at one side of said top and bottom rolls, the path of travel of said sheet material through said sets of rolls being such that an increase in the tension of said material urges said intermediate rolls horizontally toward said top and bottom rolls more tightly to grip said material therebetween and prevent slippage, driving means associated with said rolls for driving said delivery rolls at a predetermined higher peripheral speed than said entry rolls to stretch said material a predetermined amount per lineal unit as said material passes through said apparatus, and means for adjusting said driving means to vary the differential between said peripheral speeds of said sets of rolls to control the degree of stretching imparted to said sheet material.

6. A stand of driven gripping rolls adapted to progress sheet material under tension comprising a pair of outer rolls journaled on spaced apart fixed axes, an intermediate roll having a diameter greater than the peripheral spacing of said outer rolls journaled in offset relation to a plane through said fixed axes on an axis adjustable at right angles to said plane, yieldable means for moving said intermediate roll away from said outer rolls to permit threading of said sheet material therebetween, said material being looped about said intermediate roll, said yieldable means also being effective to move said intermediate roll toward said outer rolls tightly to grip said material as said rolls are driven, said yieldable means upon an increase in the tension of said sheet material permitting further movement of said intermediate roll toward said outer rolls by said tension more tightly to grip said material and prevent slippage thereof relative to said rolls.

7. A flexible gripping roll for use in a stand of tension rolls for sheet metal strip, comprising a central shaft, a pair of end members rigidly secured to said shaft in spaced apart relation to each other, a relatively thin metal cylinder supported on said end members in coaxial relation to said shaft, and a plurality of annular disc-like stiffening members surrounding said shaft in spaced relation thereto, said annular members being secured to the inner surface of said cylinder in relatively closely spaced axial relation to each other and being relatively very thin as compared with their radial extent.

8. A flexible roll for sheet metal work having a working surface comprising a hollow cylindrical member capable of flexure, a shaft, spaced apart supporting means for mounting said cylindrical member on said shaft in coaxial relation, and a plurality of annular disc-like members secured to the inner surface of said cylindrical member in relatively closely spaced relation, said disc-like members surrounding said shaft and having internal diameters greater than the diameter of said shaft and being relatively very thin as compared with their radial extent.

9. A flexible roll for sheet metal work comprising a relatively thin walled cylinder, a plurality of annular discs secured to the inner surface of said cylinder in relatively closely spaced axial relation to each other, said discs being relatively very thin as compared with their radial extent, a shaft extending through said annular discs in spaced relation to the inner edges thereof, and supporting members secured to said shaft and said cylinder adjacent the ends thereof for mounting said cylinder on said shaft in coaxial relation thereto.

CARL B. ANDERSON.

REFERENCES CITED

The following references are of record in the file of this patent:

UNITED STATES PATENTS

| Number | Name | Date |
|---|---|---|
| 408,219 | Curtin | Aug. 6, 1889 |
| 437,413 | Eckerson | Sept. 30, 1890 |
| 672,516 | Schinneller | Apr. 23, 1901 |
| 723,682 | Kortright | Mar. 24, 1903 |
| 1,200,076 | Burgess | Oct. 3, 1916 |
| 1,239,175 | Gilbert | Sept. 4, 1917 |
| 1,467,880 | Roemer | Sept. 11, 1923 |
| 1,490,549 | Woodworth | Apr. 15, 1924 |
| 1,584,499 | Zachhuber | May 11, 1926 |
| 1,624,394 | Cronk | Apr. 12, 1927 |
| 1,923,738 | McBain | Aug. 22, 1933 |
| 1,986,776 | Moore | Jan. 1, 1935 |
| 2,040,442 | Nieman | May 12, 1936 |
| 2,073,174 | Potter | Mar. 9, 1937 |
| 2,140,533 | MacChesney | Dec. 20, 1938 |

FOREIGN PATENTS

| Number | Country | Date |
|---|---|---|
| 168,501 | Switzerland | July 2, 1934 |
| 453,643 | Great Britain | Sept. 14, 1936 |
| 463,374 | Great Britain | Mar. 30, 1937 |

Certificate of Correction

Patent No. 2,504,292 April 18, 1950

CARL B. ANDERSON

It is hereby certified that errors appear in the printed specification of the above numbered patent requiring correction as follows:

Column 1, line 17, for the word "exerted" read *exerting*; column 8, line 34, for "parts" read *path*;

and that the said Letters Patent should be read with these corrections therein that the same may conform to the record of the case in the Patent Office.

Signed and sealed this 1st day of August, A. D. 1950.

[SEAL]

THOMAS F. MURPHY,
*Assistant Commissioner of Patents.*